SYNCHRONIZING APPARATUS FOR COLOR SIGNAL SAMPLING OSCILLATORS

Filed April 1, 1950 2 SHEETS—SHEET 1

INVENTORS
PETER H. WERENFELS
& LOY E. BARTON
BY
ATTORNEY

INVENTORS
PETER H. WERENFELS
& LOY E. BARTON
BY
ATTORNEY

Patented Apr. 29, 1952 2,594,380

UNITED STATES PATENT OFFICE 2,594,380

SYNCHRONIZING APPARATUS FOR COLOR SIGNAL SAMPLING OSCILLATORS

Loy E. Barton and Peter H. Werenfels, Princeton, N. J., assignors to Radio Corporation of America, a corporation of Delaware Application April 1, 1950, Serial No. 153,396

2 Claims. (Cl. 178—7.3)

This invention relates to television receivers and, in particular, to synchronizing apparatus to be employed therein.

In certain color television systems the video signal must be sampled at the transmitter and receiver during corresponding intervals. This means that the phase of the sampling process of the receiver with respect to the video signals must be the same as the phase of the sampling process at the transmitter with respect to the video signals. In order to exactly synchronize the phase of the sampling oscillators at the transmitter and receiver, it has been previously suggested that a burst of the sampling frequency be inserted into the signal train during the back porch interval. This interval follows the horizontal sync pulse which initiates the scanning of each line of the raster in the receiver.

It has been previously suggested that the burst of sampling frequency that is derived from the transmitter and the output of the sampling oscillator at the receiver be compared in a phase discriminator. The output of the phase discriminator is then employed to control a reactance tube or similar device so as to properly adjust the frequency of the sampling oscillator.

In other arrangements, however, the output of the sampling oscillator has been continuously applied to the phase discriminator. The discriminator used in such cases was such that it produced no output unless both signals were applied to it. However, in order that this condition exist, this type of discriminator must be perfectly balanced.

In accordance with this invention, it makes no difference whether the discriminator is accurately balanced or not. Briefly stated, this is accomplished by gating the output of the sampling oscillator in the receiver at the same time that the burst of sampling frequency is present in the received wave. In this way, the frequencies being compared are applied to the discriminator at the same time.

It is accordingly the object of this invention to provide an improved apparatus for synchronizing a sampling oscillator at a receiver with a burst of sampling frequency inserted in the transmitter signal. This is done in such a way that a necessity for precise adjustment of some of the circuits involved is eliminated.

This and other objects and advantages will become apparent from a detailed consideration of the drawing in which.

Figure 1:
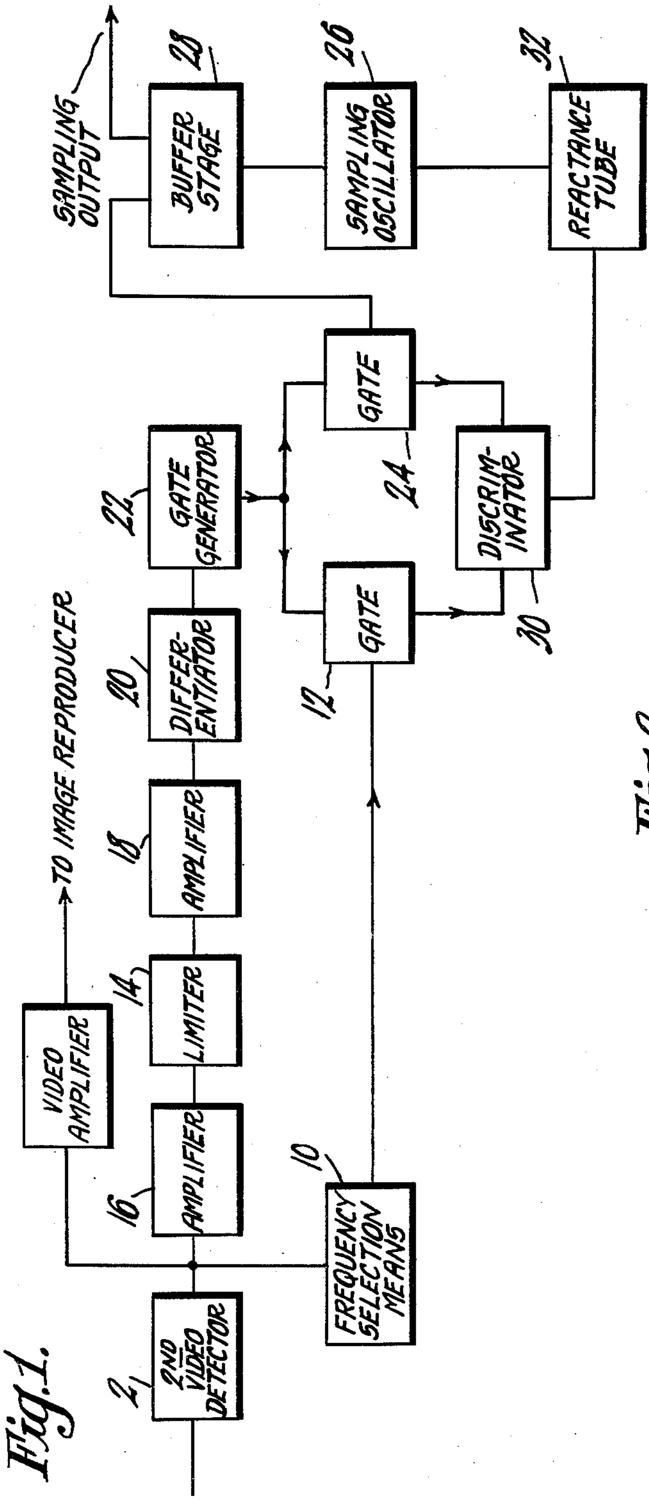
Figure 1 illustrates in block diagram a receiver embodying the principles of this invention.
Figure 2:
Figure 2 illustrates the type of wave form with which the synchronizing apparatus in the receiver of Figure 1 is adapted to cooperate.

The output signal of a standard second video detector 2, such as illustrated in Figure 2, is employed. Referring briefly to Figure 2, it will be noted that a burst of sampling frequency 4 is superimposed upon the blanking pulse 6 during the portion of the signal following the horizontal sync pulse 8. Referring again to Figure 1, the frequency selective means 10 is tuned to the frequency of the burst 4 and is connected between the output of the second detector 2 and the gate 12. The video signals following the burst of sampling frequency 4 may also have components of the sampling frequency. These also will pass through the frequency selection means 10. However, as the video signals cannot pass through the gate 12, they cannot affect the control circuits. Signals of other frequencies occurring during the burst are not passed to the gate 12 by the sampling frequency selective means 10.

The output of the second detector 2 is also applied to a limiter 14 via an amplifier 16. The limiter 14 is biased in such a way as to permit the passage of the signals having an amplitude in excess of the dotted line 18 of Figure 2. The sync pulse 8 and the burst of sampling frequency 4 will therefore be passed by the limiter. This signal is applied to a differentiation circuit 20 via an amplifier 18. In this way, a positive pip appears at the leading edge of the horizontal sync pulse 8 and a negative appears at the trailing edge of this sync pulse. Either of these pips may be employed to trigger a gate generator 22. Once the triggering action has taken place, the effect of the burst frequency 4 has no effect and therefore its presence can be tolerated.

The gate pulse generator 22 may provide a pulse occurring any time during or after the horizontal sync pulse 8. In the event the burst of sampling frequency 4 occurs during the back porch intervals, as shown, it is preferable that the gating pulse appears only at this time. The gating pulse is applied simultaneously to the gate 12 and to another gate 24. The output of a sampling oscillator 26 is applied to the gating tube 24 via a buffer stage 28.

When the gating pulse is present, the other gate 12 applies the burst of sampling frequency 4 to a discriminator 30. At the same time the gate 24 applies a burst derived the local sampling oscillator 26 to the discriminator 30. The output of the discriminator controls the frequency of the oscillator 26 in any well known fashion. For example, a reactance tube 32 may be connected between the discriminator 30 and sampling oscillator 26, as shown.

Figure 3:
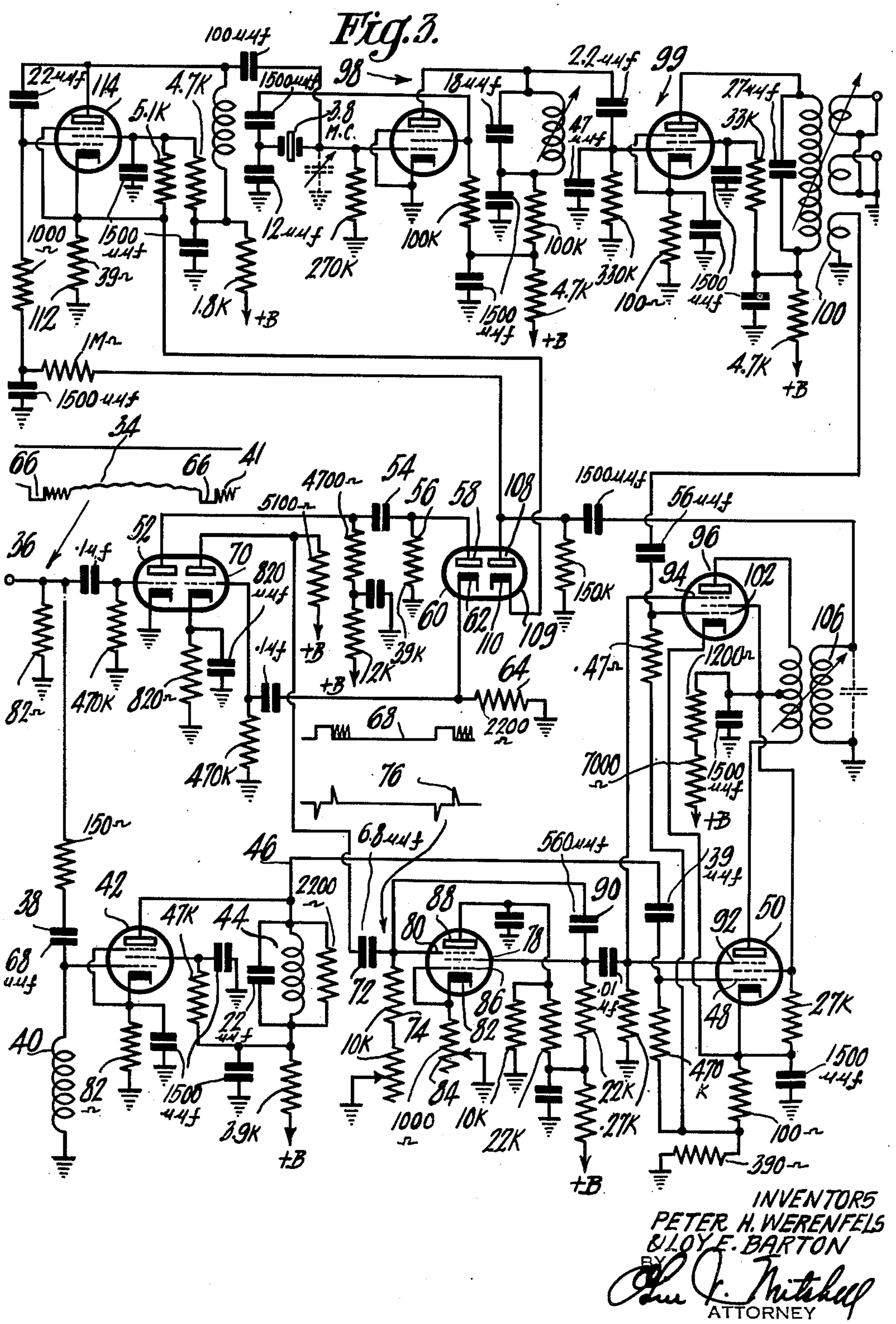
Figure 3 illustrates the receiver of Figure 1 in schematic form.

Reference is now made to the schematic circuit of Figure 3. This invention is not confined to the details of this circuit, but the arrangement shown is one practical form which the invention may assume. The output of the second detector of the television receiver is illustrated by a wave form 34 that appears at the input terminal 36. A condenser 38 and an inductance 40 are connected in series between the terminal 36 and ground and are tuned to the frequency of the burst 4 of Figure 2. This burst is indicated also in the wave form 34 by the numeral 41. The large voltage thus built up across the inductance 40 is applied to an amplifier 42. The plate circuit of the amplifier 42 includes a parallel resonant circuit 44 tuned to the sampling frequency. The sampling burst, after being accentuated in this manner, is applied to a grid 48 of a gating tube 50. More details concerning the gating circuit will be presented at a later point in the discussion. The signal represented by wave form 34 is also applied to an amplifier 52. The plate of this amplifier is connected to ground via a condenser 54 and a resistor 56 in series. The junction between the condenser 54 and the resistor 56 is connected to the plate 58 of a diode 60. The cathode 62 of this diode is connected to ground via a relatively low resistor 64. The time constant of the condenser 54 and the resistor 56 is long in comparison with a line scanning interval that occurs between the horizontal sync pulses 66 of the wave form 34. The now positive horizontal sync pulses 66 rapidly charge the condenser 54 through the small resistor 64 and the diode 60. The condenser 54 then discharges through the large resistor 56. If this discharge time of condenser 54 is sufficiently long, it can be seen that no video signals will therefore appear in the resistor 64. The horizontal sync pulses 66 and the bursts of sampling frequency 41 are thus separated by amplitude selection from the rest of the signal train, as indicated by the wave form 68. This wave form is then applied to an amplifier 70.

The output of the amplifier 70 is differentiated by a condenser 72 and a resistor 74 that are connected in series between the plate of the amplifier 70 and ground. The horizontal sync pulses 66 are thus differentiated so as to form the wave form indicated by the numeral 76 as shown.

The following details relate to the particular type of trigger circuit shown in the schematic diagram of Figure 3. Other trigger circuits may be employed, but this has been found to be effective and to require a fewer number of component parts. Although other pentodes might be used, the tube 78 is shown as a 6AS6. Under quiescent conditions, the tube 78 draws no plate current. The reason for this is that a suppressor grid 80 is made negative with respect to a cathode 82 by the current drawn through a cathode resistor 84 by a screen 86. Upon application of a positive pulse in the wave form 76 to the suppressor grid 80, the plate 88 draws current and so reduces the amount of current drawn by the screen 86. The decrease in screen current increases the voltage of the screen. This increase in voltage is coupled to the suppressor grid 80 via a condenser 90. The action is regenerative up to the point where the condenser 90 is fully charged. As the condenser 90 becomes fully charged the voltage on the suppressor 80 gradually drops until it comes sufficiently negative with the cathode 82 to again cut off plate current. This action is also regenerative and accordingly a positive pulse is provided by the screen 86.

This positive gating pulse is then coupled to a grid of a gating tube 50 and also to a grid 94 of a gating tube 96.

The sampling oscillator whose frequency is to be controlled is indicated generally by the numeral 98 at the top center of the figure. A portion of its output is tapped off from the output of an intervening buffer stage 99 by a coil 100 and coupled in inverse phase to a grid 102 of the gating tube 96. It will be remembered that the burst of sampling frequency with which the oscillator 98 is to be synchronized is coupled to the grid 48 of the other gating tube 50. The gating tubes 50 and 96 are connected in push-pull and their outputs combined in a tuned circuit 106.

Another advantage of this push-pull arrangement is that the plate currents of the two gate tubes are compensated and produce no oscillations in the output due to the switching of the tubes.

The voltage appearing across the tuned circuit 106 at the right center of the figure is rectified by a diode 109 comprised of a plate 108 and a cathode 110. This output voltage is developed across a cathode resistor 112 of a reactance tube 114. The change in the current of the reactance tube thus produced varies the phase and frequency of the oscillator 98. When the output of the oscillator 98 is in phase with the burst of control frequency, the voltage appearing across the tuned circuit 106 is a minimum and vice versa. This is because the output of the oscillator 98 is coupled to the gate 96 in inverted phase. The frequency of the oscillator 98 is less than the frequency of the burst when the reactance tube is not receiving any bias from the diode 49. Therefore, when the output of the oscillator 98 and the burst are of like frequency, but out of phase by a given amount, the reactance tube will be so biased that it maintains the phase relationship.

Having described my invention, what is claimed is:

1. A television receiver having means for synchronizing a sampling oscillator with a portion of the received signal located on the back porch of the transmitted signal comprising in combination a second detector, a limiter connected so as to receive the output of said second detector, said limiter being biased to pass only those signals in excess of a predetermined level, a differentiation circuit connected so as to receive the signals passed by said limiter, a gate signal generator connected so as to be triggered by the output of said differentiation circuit, a first gating means and a second gating means connected to the output of said gate generator so as to be capable of passing signals during the presence of said gating signal, a frequency selective circuit connected so as to receive the output signals of said second detector, said frequency selective means being adapted to accentuate the frequency of the signals appearing on the back porch of the transmitted wave, the output of said circuit being applied to said first gating means, connections between the output of said sampling oscillator and said second gating means, a discriminator, said discriminator being connected to the outputs of said first and second gating means, and a reactance tube adapted to control the frequency of said sampling oscillator in accordance with this output of said discriminator.

2. A television receiver adapted to have its sampling oscillator synchronized with a burst of sampling frequency following the horizontal sync pulse that is part of the received signal comprising in combination means for detecting said signals, means for deriving a gating pulse in response to said horizontal sync pulse, said gating pulse occurring during said burst of sampling frequency, a first gate, a second gate, connections for applying said gating pulse to said first and second gates, said gates being thereby rendered operative to pass signals, means for applying the received signal to said first gate, means for applying the output of said sampling oscillator to said second gate, a phase comparing device connected so as to receive the output of said first and second gates, and means for controlling the phase of said sampling oscillator in response to the output of said phase comparing device.

LOY E. BARTON.
PETER H. WERENFELS.

REFERENCES CITED

The following references are of record in the file of this patent:

UNITED STATES PATENTS

| Number | Name | Date |
|---|---|---|
| 2,319,789 | Chambers | May 25, 1943 |
| 2,378,746 | Beers | June 19, 1945 |
| 2,458,156 | Fredenall | Jan. 4, 1949 |
| 2,458,649 | Schade | Jan. 11, 1949 |
| 2,467,436 | Krumhansl et al. | Apr. 19, 1949 |
| 2,491,804 | Fleming et al. | Dec. 20, 1949 |